United States Patent [19]

Uhtenwoldt

[11] 4,193,227

[45] * Mar. 18, 1980

[54] ADAPTIVE GRINDING CONTROL

[75] Inventor: Herbert R. Uhtenwoldt, West Boylston, Mass.

[73] Assignee: Cincinnati Milacron-Heald Corporation, Worcester, Mass.

[*] Notice: The portion of the term of this patent subsequent to Apr. 3, 1996, has been disclaimed.

[21] Appl. No.: 917,415

[22] Filed: Jun. 21, 1978

[51] Int. Cl.² .................................................. B24B 49/16
[52] U.S. Cl. .............................. 51/165.77; 51/165.92; 51/291
[58] Field of Search ................... 51/34 D, 35, 165.77, 51/165.91, 165.92, 165.93, 291

[56] References Cited

U.S. PATENT DOCUMENTS

| | | | |
|---|---|---|---|
| 3,667,165 | 6/1972 | McDowell et al. | 51/35 |
| 3,708,922 | 1/1973 | Gluchowicz | 51/165.92 |
| 3,913,277 | 10/1975 | Hahn | 51/165.92 |
| 3,939,610 | 2/1976 | Suzuki | 51/35 |
| 4,014,142 | 3/1977 | Coes | 51/165.92 |
| 4,137,677 | 2/1979 | Nedreski | 51/165.92 |

Primary Examiner—Harold D. Whitehead
Attorney, Agent, or Firm—Jack J. Earl; James D. Liles

[57] ABSTRACT

A method and apparatus for controlling the infeed of a grinding machine senses the interface force between a grinding wheel and a workpiece to control infeed for grinding a workpiece with diverse grindability characteristics. The infeed is increased in response to an increase in the sensed force until the interface force reaches a predetermined level; while the interface force is decreased to a predetermined level in response to a decrease in the sensed force.

3 Claims, 3 Drawing Figures

ADAPTIVE GRINDING CONTROL

BACKGROUND

In grinding surfaces upon workpieces, the always difficult problem of maintaining a proscribed geometry to a low tolerance is compounded substantially whenever the grindability characteristics are variable upon a single surface. Due to the variable grinding characteristics, different metal removal rates may result for different sections upon the single surface whenever the grinding wheel-workpiece interface force is constant. For example, for a constant engagement force between the grinding wheel and a workpiece, the metal removal rate for an extremely hard material will frequently be less than the corresponding removal rate for a softer material. If the extremely hard material is intermittently inserted into a section of the surface of a parent workpiece of a softer material, as is done in a variety of applications, the resulting surface to be ground has disparate grindability characteristics. The disparity in the grinding characteristics of the two materials obviously presents problems in grinding surfaces which require a high degree of geometric exactitude.

Different grindability characteristics are also presented by a surface which is partially interrupted, as for example, interruptions, by holes and/or flats. Holes and/or flats vary the contact area between the grinding wheel and the workpiece and frequently, vary the unit force applied to the contacted portions of the surface. Since the metal removal rate is most commonly a function of the applied unit forces, it varys accordingly. Consequently, holes and/or flats frequently have presented problems in forming proscribed geometrics during the grinding process in prior art machines.

Further, virtually all grinding machines experience some deflection in the grinding wheel support system whenever the wheel is urged against the workpiece. This deflection results in a reactant spring force which is applied against the workpiece, the magnitude of the spring force being proportional to the product of the support system spring rate and the magnitude of the deflection. Deflection is particularly pronounced when the grinding wheel is mounted upon a quill in cantilevered support, as the wheel support system not only experiences deflection in the bearings and the wheel itself, but the quill suppporting the grinding wheel inherently deflects substantially whenever a force, such as that resulting from engagement with a workpiece, is applied to its end portion. The unequal resistances offered by disparate grinding characteristics upon different sections of a single grinding surface result in different deflections and consequently different metal removal rates for the different sections of the surface; and this nonuniformity of metal removal rates produces a part which does not meet the proscribed geometrical tolerances.

SUMMARY OF THE INVENTION

In accordance with the invention, the interface force between the grinding wheel and a workpiece is varied to accomodate diverse grindability characteristics of the workpiece in order to equalize the metal removal rate and to obtain a strict geometric tolerance. The interface force between the wheel and the workpiece is sensed. A signal whose magnitude varies as a function of the sensed force is generated and utilized to increase the interface force to a predetermined level in response to an increase in the sensed force; and to decrease the interface force to a predetermined level in response to a decrease in the sensed force.

DETAILED DESCRIPTION OF THE PREFERRED EMBODIMENT

The invention relates generally to grinding and more particularly to the grinding of workpieces having disparate grindability characteristics. It will be specifically disclosed in connection with a grinder having a cantilever supported abrasive wheel used to grind a workpiece having a hardened alloy insert embedded in a section of the workpiece surface which is to be ground.

Figure 1:
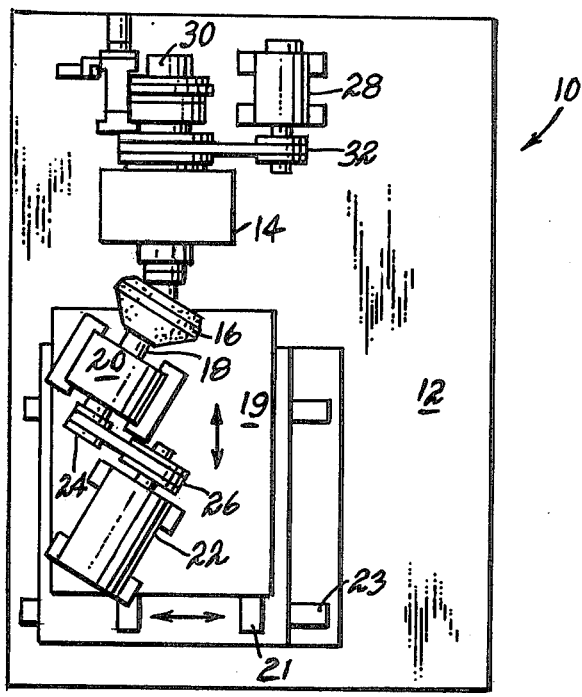
FIG. 1 is a plan view of one type of grinding machine which might employ the method and apparatus of the present invention.

Referring now to the drawings and to the environmental view of FIG. 1 in particular, one type of grinding machine 10 which might employ the present invention is depicted. The grinding machine 10 has a base 12 upon which a workpiece fixture 14 and an abrasive or grinding wheel 16 are supported. The abrasive wheel 16 is mounted upon a quill 18 in cantilevered support. The quill 18 is rotatably supported by a spindle (not shown) mounted upon bearings within a housing 20 which is in turn supported upon the base 12. A motor 22 is drivingly engaged to a spindle drive 24 by belts 26 to rotate the spindle and consequently the grinding wheel in a conventional fashion. The housing 20 as well as the motor 22 and the spindle drive 24 are all mounted upon a wheelhead platform 19 which is movable in mutually perpendicular directions upon way systems 21 and 23, respectfully.

The workpiece fixture 14 which supports and rotates the workpiece is driven by a second motor 28 which is drivingly engaged to the workpiece spindle 30 by a belt 32.

Figure 2:
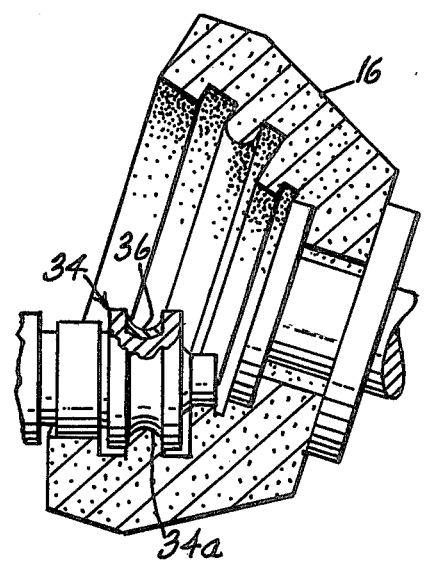
FIG. 2 is a side elevational view, partially in cross-section, of a workpiece which might be machined upon the apparatus of the invention shown in contact with a grinding wheel.

FIG. 2 illustrates a workpiece 34 upon which the method and apparatus of the present invention might be effectively employed. The workpiece 34 is of the type used in a spindle support for a rock bit used in oil drilling operations. Because stresses upon the workpiece 34 are concentrated most heavily upon one circumferential sector of a bearing raceway 34a of the finished workpiece 34 in its intended application, an insert 36 of an extremely hard metal alloy (for example, STELLITE) is embedded in this circumferential sector by metalizing. The workpiece 34 is depicted as being ground by the internal surface of the cup-shaped abrasive wheel 16. The grindability characteristics of the insert 36 are markedly different from the remaining portions of the raceway 34a. Consequently, for a given interface force between the grinding wheel 16 and the workpiece 34, different metal removal rates will be experienced for the different circumferential sections of the workpiece 34, seriously compromising the roundness which is critical for the bearing raceway 34a.

The disclosed apparatus approaches the above difficulty by varying the infeed, and consequently the interface force between the workpiece 34 and the abrasive wheel 16 within a single surface of revolution. In carrying out the invention, the apparatus of the preferred embodiment senses the interface force between the grinding wheel 16 and the workpieces 34. This interface force increases as the wheel 16 engages the hardened insert 36.

Figure 3:
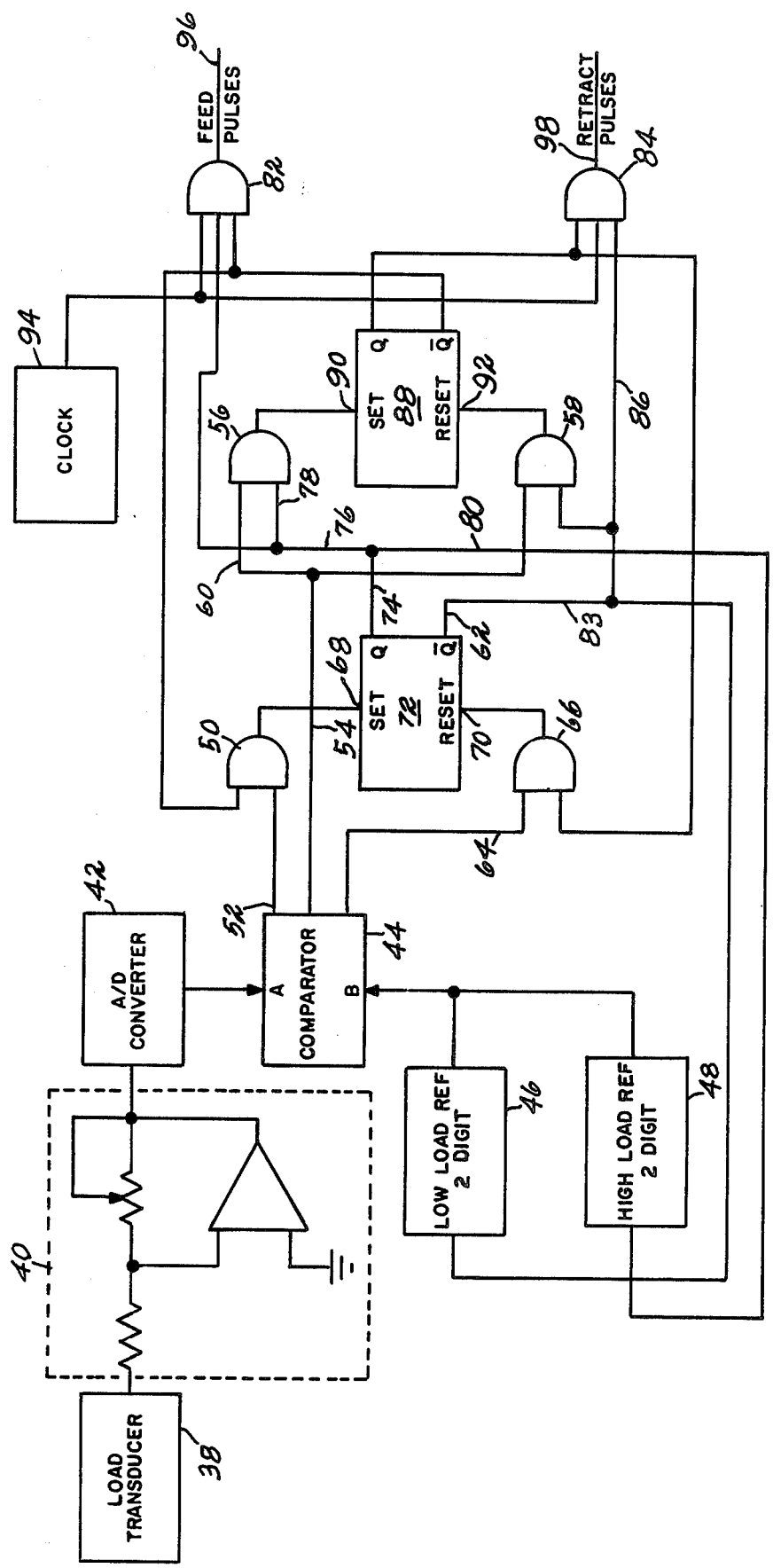
FIG. 3 is a schematic representation of a correction circuit for partially controlling the infeed of the grinding machine of FIG. 1.

As illustrated in FIG. 3, a load transducer 38 senses the interface force between the grinding wheel 16 and the workpiece 34 and generates an analogue force signal whose magnitude is proportional to this sense parameter. The load transducer may take any of several conventional forms, as for example, a current or watt transducer connected to the grinding wheel spindle motor 22. Alternatively, the load transducer may be a strain gauge transducer mounted on any suitable location, as for example, the wheelhead platform or the grinding wheel spindle. The signal generated by the transducer is adjusted by a calibration gain 40 and applied to an analogue-to-digital converter 42 (an eight-bit converter would be appropriate for that preferred embodiment). The converter converts the force signal to a binary coded decimal signal which is in turn applied to a comparator 44 (again eight-bit in the preferred embodiment) where the force signal is compared to one of two reference signals generated from thumbwheel switches 46 and 48.

Thumbwheel switches 46 and 48 are selectively activiated to apply either a low level reference (from switch 46) or a high level reference (from switch 48) to comparator 44 for comparison with the force signal.

Comparator 44 has three outputs. The first of these outputs is connected to an AND gate 50 by a line 52. The second comparator output is carried by line 54 to two AND gates 56 and 58 along lines 60 and 62 respectively. The third output from comparator 44 is supplied along 64 to AND gate 66.

The AND gates 50 and 66 apply their outputs to a set input 68 and a rest input 70 respectively of a bistable flip flop 72. The set output (Q) is applied along line 74 and then lines 76 and 78 and 80 to AND gate 82, AND gate 56 and high load reference thumbwheel switch 48, respectively. The reset ($\overline{Q}$) output of flip flop 72 is applied along line 83 to low lead reference thumbwheel switch 46 and to AND gate 84 along line 86, the line 86 branching off line 83. A second flip flop 88 has respective set 90 and reset inputs 92 from the outputs of AND gates 56 and 58. The set (Q) output of this second flip flop 88 is an input to AND gates 84 and 66. The reset output ($\overline{Q}$) of this same element serves as an input to AND gates 82 and 50.

A timing clock 94 generates a succession of fixed duration pulses which are input to AND gates 82 and 84.

In operation, the flip flops of FIG. 3 are initially in their reset positions. When the grinding wheel 16 engages a hard material, the load transducer 38 experiences this transition and generates an output analogue signal in response thereto. This generated signal is then applied to analogue-to-digital converter 42 via calibration gain 40.

The output of analogue-to-digital converter 42 is of a greater magnitude than that produced by either low load reference 46 or high load reference 48 when the wheel 16 initially engages the hardened portion 36 of workpiece 34, and of an intermediate level while the grinding wheel 16 is engagement with the softer portion of the workpiece 34.

During the transition from soft to hard material the output of analogue-to-digital converter 42 is initially compared to a signal from low load reference 46. Since the magnitude of signal generated by the load transducer 38, and ultimately that of signal output from an analogue-to-digital converter 42 will be of greater magnitude than that of the low load reference 46, comparator 44 produces an output signal along line 52 to AND gate 50. The AND gate 50 is also receiving an input from the reset output of flip flop 88. The simultaneous occurrence of both of these inputs produces a positive (1) state output from AND gate 50 which changes the value of flip flop 72 to generate a set output and activate the high load reference 48.

The set output of flip flop 72 is applied to AND gates 56 and 82. The latter AND gate 82 also receives an input from the RESET output of flip flop 88 and timing clock 94. Thus, for each pulse of the clock 94, AND gate 82 will produce a feed pulse output signal which would be applied to along line 96 to a sequence driver (not shown) to activate the infeed stepping motor.

As the feed pulses advance the wheel 16 toward the workpiece, the magnitude of load transducer 38 is increased. When this increase is such that the magnitude of the converter 42 output is equal to the magnitude of the high load reference 48, output from the converter 42 is terminated and a pulse output along line 54 is activated and applied to AND gates 56 and 58. Since flip flop 72 is in the set value, a positive logic is output from AND gates 56 and applied to flip flop 83 to change its state to produce positive logic only at the set output. This change of state in a flip flop 88 turns off the feed pulses.

When the hard to soft material transition occurs between the grinding wheel 16 and workpiece 34, the magnitude of the output from converter 42 becomes less than that of high load reference 48. Consequently, output pulses are generated along line 64 and applied to AND gate 66, the AND gate 66 is also receiving an input from flip flop 88 at this time. Accordingly, this gate 66 will produce an output for changing the state of flip flop 72 which will switch in the low load reference 46 and enable AND gate 84 to produce retract pulses along line 98 to the sequence driver (not shown) with the occurrence of a pulse from timing clock 94. The retract pulses continue to be generated from AND gate 84, and applied the sequence drive until the magnitude of the input from converter 42 equals that of low load reference 46. When parity is reached between the converter 42 and reference inputs to comparator 44 flip flop 88 is returned to reset RESET state and the RETRACT pulses are terminated.

While the invention has been described only in terms of the preferred embodiment, persons skilled in the art to which it pertains will readily appreciate changes and modifications which may be made without departing from the spirit of the invention. Accordingly, it is not intended to be limited except by the scope of the appended claims.

What is claimed is:

1. A method of grinding a workpiece with diverse grindability characteristics, comprising:
   (a) interfacing a grinding wheel with a workpiece;
   (b) sensing the interface force between the wheel and the workpiece;

(c) generating a signal whose magnitude varies as a function of the sensed force;
(d) utilizing the generated signal to increase the interface force to a predetermined level in response to an increase in sensed force; and
(e) utilizing the generated signal to decrease the interface force to a predetermined level in response to a decrease in sensed force.

2. A grinding machine for grinding workpieces with diverse grindability characteristics, comprising:
 (a) a base;
 (b) a grinding wheel rotably mounted upon said base;
 (c) a workpiece support for supporting a workpiece with diverse grindability characteristics;
 (d) means for effectuating relative infeed movement between said grinding wheel and said workpiece support;
 (e) means for generating a signal whose magnitude varies as a function of the interface force between said grinding wheel and a workpiece supported in said workpiece support;
 (f) first means utilizing said generated signal for increasing the infeed in response to an increase in said sensed force, said first means increasing the infeed until the interface force reaches a predetermined level; and
 (g) second means utilizing said generated signal for decreasing the infeed in response to a decrease in said sensed force, said means decreasing the infeed until the interface force reaches a predetermined level.

3. A grinding machine as recited in claim 2 wherein said signal generating means includes a transducer responsive to electrical energy used by an electrical spindle motor utilized to rotably power said grinding wheel.